United States Patent [19]

Loftis et al.

[11] Patent Number: 5,023,803

[45] Date of Patent: Jun. 11, 1991

[54] PROCESS TO CONTROL THE ADDITION OF CARBONATE TO ELECTROLYTIC CELL BRINE SYSTEMS

[75] Inventors: Donald B. Loftis; David D. Justice, both of Cleveland, Tenn.

[73] Assignee: Olin Corporation, Cheshire, Conn.

[21] Appl. No.: 335,315

[22] Filed: Apr. 10, 1989

[51] Int. Cl.$^5$ .............................................. G06F 15/46
[52] U.S. Cl. ................................. 364/497; 210/687; 210/739; 364/500; 364/502
[58] Field of Search ............... 364/509, 510, 500, 502, 364/496, 497, 148; 204/87, 98, 129.2; 422/261; 423/179, 186; 210/687, 696, 739

[56] References Cited

U.S. PATENT DOCUMENTS

| | | | |
|---|---|---|---|
| 4,038,365 | 7/1977 | Patil et al. ............................ | 204/128 |
| 4,155,819 | 5/1979 | Carlin ................................... | 204/98 |
| 4,246,241 | 1/1981 | Mathur et al. ....................... | 204/128 |
| 4,396,977 | 8/1983 | Slater et al. ......................... | 364/500 |
| 4,459,188 | 7/1984 | Rutherford et al. ................. | 204/128 |
| 4,469,146 | 9/1984 | Campbell et al. ................... | 364/502 |
| 4,568,465 | 2/1986 | Davis et al. .......................... | 364/500 |
| 4,589,072 | 5/1986 | Arimatsu ............................. | 364/500 |
| 4,747,917 | 5/1988 | Reynolds et al. .................... | 204/98 |
| 4,783,269 | 11/1988 | Baba et al. ......................... | 364/500 |
| 4,855,061 | 8/1989 | Martin ................................. | 364/500 |
| 4,907,167 | 3/1990 | Skeirik ................................ | 364/500 |

Primary Examiner—Kevin J. Teska
Attorney, Agent, or Firm—Ralph D'Alessandro

[57] ABSTRACT

A process to control the addition of excess carbonate to brine systems is provided wherein the process measures the raw brine flow rate through the carbonate reactors, the concentration of calcium in the brine feeding the reactors and the concentration of carbonate in the sodium carbonate feed tank to calculate the quantity of sodium carbonate necessary to remove substantially all of the calcium impurity in the brine by precipitating it out as a calcium carbonate flocculant. The process is automated and employs an information feed forward system.

6 Claims, 1 Drawing Sheet

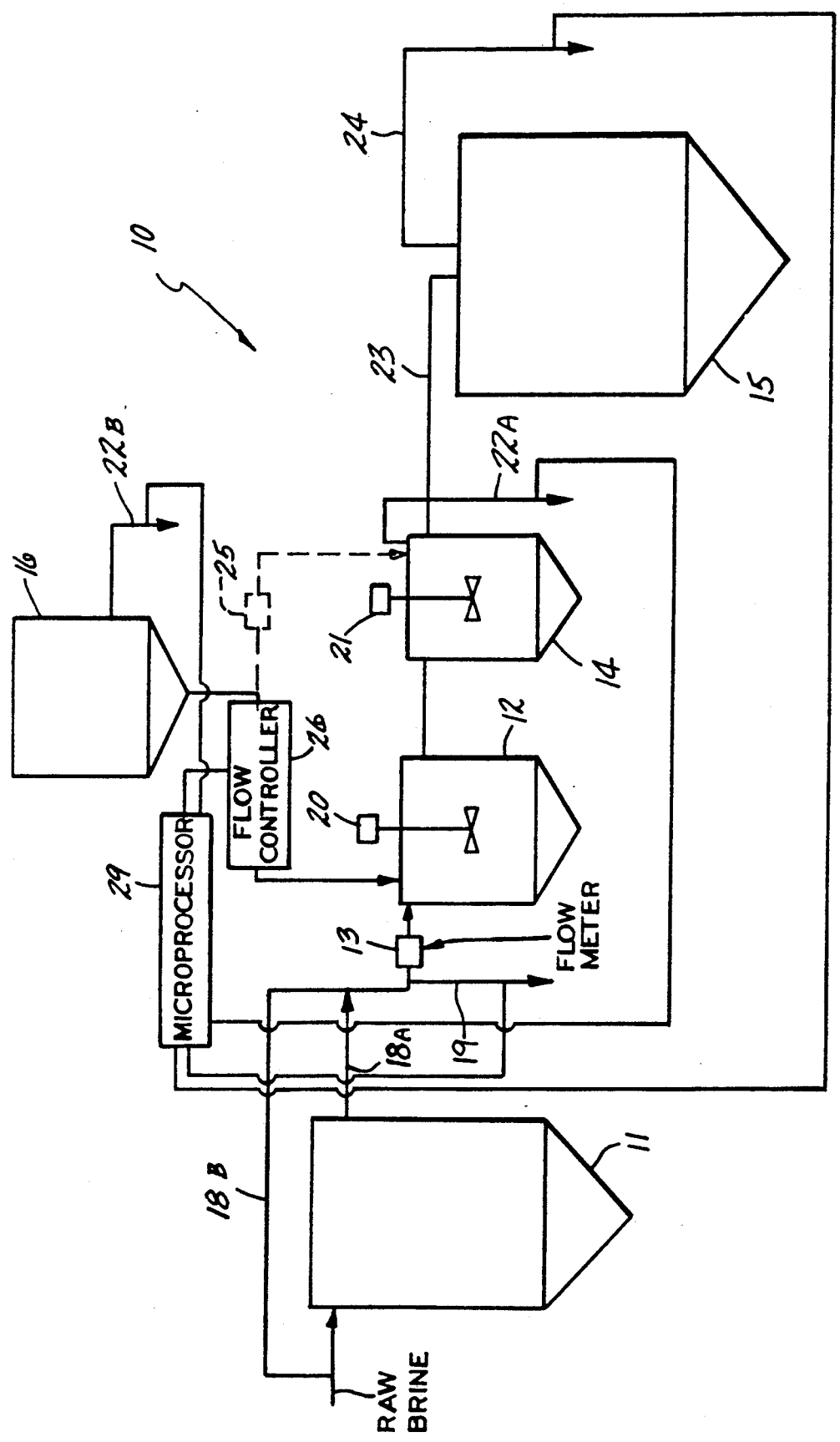

PROCESS TO CONTROL THE ADDITION OF CARBONATE TO ELECTROLYTIC CELL BRINE SYSTEMS

BACKGROUND OF THE INVENTION

This invention relates generally to a process for treating a brine system for an electrolytic cell. More specifically, it pertains to a process which controls the amount of excess carbonate added to the brine system to substantially remove by precipitation all of the calcium impurity in the brine as a calcium carbonate precipitated flocculant.

Typical methods of treating brine for electrolytic cell systems have employed feedback mechanisms which require frequent samplings of the brine based on conditions that are several hours old by the time the results are obtained. For example, where calcium carbonate is being measured in a settling tank, approximately 1-2 hours is necessary to obtain the settling of the calcium carbonate in order to obtain an accurate reading of the carbonate concentration. The carbonate concentration, as are most concentrations measured in a brine system, is determined by titration techniques. This approach does not give the concentration of the ionic species, in this instance carbonate, within the brine system at the time of sampling, but rather at the time 1-2 hours after the settling has occurred.

Additionally, prior systems employ carbonate addition which is controlled by a manually adjusted valve. Titrations are taken on a regular basis, such as every 2 hours, and the carbonate addition is adjusted as needed based on the titration results. There is no measurable basis in this type of a system, however, to determine how much to increase or decrease the carbonate addition. This frequently results in overshooting of the operating target. The amount of carbonate consumed during this type of a manually adjusted operation can be as much as 20% more than is necessary if the adjustment were optimally controlled. This approach suffers from a lack of knowledge of the current process conditions and requires costly, frequent sampling and analysis by operators. There is no rapid way to compensate for process upsets that periodically occur during operation.

These problems are solved in the use of the process of the present invention by providing a process to control the concentration of excess carbonate by the addition of sodium carbonate to electrolytic cell brine systems. The process can be automated.

SUMMARY OF THE INVENTION

It is an object of the present invention to provide a process to control the concentration of excess carbonate by the addition of sodium carbonate to electrolytic cell brine systems.

It is another object of the present invention to provide an automated process to control the concentration of excess carbonate by the addition of sodium carbonate to electrolytic cell brine systems.

It is a feature of the present invention that the process determines the amount of excess carbonate present in the brine system within a relatively short time after brine treatment by sodium carbonate addition.

It is another feature of the present invention that the process determines the amount of calcium present in the brine system prior to treatment by sodium carbonate addition and provides this information to a control equation in what is known as a feed forward system.

It is another feature of the present invention that sufficient sodium carbonate is added to the brine to completely react the calcium impurities in the brine to thereby control carbonate precipitation.

It is another feature of the present invention that the process is automated and employs a microprocessor controller.

It is still another feature of the present invention that a control equation is utilized to calculate the addition rate of sodium carbonate to the brine system based on specific factors that can affect carbonate demand.

It is an advantage of the present invention that the process can automatically compensate for process upsets.

It is another advantage of the present invention that the need for costly, frequent sampling and analysis by operators is obviated.

It is still another advantage of the present invention that raw material costs are reduced by the reduced consumption of carbonate chemical.

It is yet another advantage of the present invention that final product quality from the electrolytic cell with which the brine system is associated is improved.

These and other objects, features and advantages are obtained by the use of the process which controls the addition of excess carbonate to electrolytic cell brine systems by knowing the raw brine flow rate through the carbonate reactor, the calcium ion concentration in the brine feeding the reactor, and the carbonate ion concentration in the sodium carbonate feed tank. Using these values, an equation is provided in the process control system to calculate the quantity of sodium carbonate necessary to precipitate out substantially all of the calcium carbonate to remove calcium as an impurity in the brine.

BRIEF DESCRIPTION OF THE DRAWING

The objects, features and advantages of the present invention will become apparent upon consideration of the following detailed disclosure of the invention, especially when it is taken in conjunction with the accompanying drawing wherein:

The FIG. is as a diagrammatic illustration of the brine system used in conjunction with an electrolytic cell showing the points at which samples and readings are taken to calculate the quantity of sodium carbonate required to precipitate out substantially all of the calcium ions as a calcium carbonate flocculant.

DETAILED DESCRIPTION OF THE PREFERRED EMBODIMENT

A typical brine treatment system 10 is illustrated in the FIG. utilizing a sodium carbonate feed into the saturated brine. The sodium carbonate is allowed to react with the brine in at least one carbonate reaction tank. As seen in the FIG., the sodium carbonate is fed from a feed tank 16 by a sodium carbonate feed line 17 which branches to feed into a first carbonate reaction tank 12 and a second carbonate reaction tank 14. Flow controllers 25 and 26 regulate the flow of sodium carbonate into the reaction tanks 12 and 14. Flow controller 25 and sampling line 22A are optional and are used only where a feedback loop is employed to control the amount of excess carbonate added to the brine system 10 by using the carbonate analysis from sampling line 22A as the process variable. Reaction tank rotors 20 and 21 agitate the brine fed by brine infeed lines 18A and/or 18B to ensure thorough mixing of the brine with the sodium carbonate. Brine infeed line 18A is utilized when the raw brine is fed through settler tank 11. Brine infeed line 18B is used when the settler tank 11 is by-passed and the sampling line 19 would be sampling only the calcium ion concentration in the raw brine.

Reaction tanks 14 and 15 are the sites where the calcium impurities in the brine react with the sodium carbonate to form insoluble calcium carbonate. The calcium carbonate is formed as a heavy flocculant that is allowed to settle in the calcium carbonate settler tank 15 after being carried there in reaction tank outlet line 23. In the brine system 10 shown in the FIG., a settler tank 11 is utilized in conjunction with the brine feed to provide the brine to the reactor tanks 12 and 14 via brine infeed line 18A. The settler tank 11 can be used to remove other common impurities found in brine, such as sulfates. For example, in the brine system 10 illustrated in the FIG., calcium can be added to the brine to control sulfate concentrations. This calcium addition makes carbonate concentration control extremely difficult because of the large fluctuations of calcium ions in the brine after the sulfate removal step.

Magnesium impurities in the brine can also be removed in the reaction tanks 12 and 14 by the addition of caustic. Although not directly related to this specific carbonate control process, the magnesium is normally present as magnesium chloride which reacts with the caustic to precipitate out as magnesium hydroxide. This is also an insoluble heavy flocculant.

The sodium carbonate combines with the calcium chloride to produce the aforementioned calcium carbonate flocculant in the reaction tanks 12 and 14 according to the following reaction:

$$Na_2CO_3 + CaCl_2 \rightarrow 2NaCl + CaCO_3.$$

The brine system 10 shown in the FIG., employs an automatic process which controls the addition of excess sodium carbonate by receiving and processing key information about the concentration and operation of the brine system 10. The system measures the flow rate of raw brine to the reaction tanks 12 and 14 by means of a flow meter 13, as well as measuring the calcium ion concentration of the brine in the settler tank 11 and/or the raw brine bypassing the settler tank 11 in brine infeed line 18B, and the carbonate concentration in the sodium carbonate feed tank 16 and in the carbonate settler 15. Where a feedback loop is utilized, the carbonate concentration in the second reaction tank 14 can be measured. A microprocessor 29, such as a Texas Instrument's Model 565 programmable controller, is used to calculate the amount of excess carbonate required in the brine to remove substantially all of the calcium impurities to an accuracy of within +/−0.1 grams per liter of the desired operating target level. The programmable controller is preferably operated through a computer operator interface station. This on-line monitoring of the parameters utilizes the following control equation to determine the desired addition rate of sodium carbonate:

$$\frac{\left(\frac{Ca^{++} gm/l}{48 \text{ gm/mole}}\right)(106 \text{ gm/mole})(\text{brine flow l/min})}{Na_2CO_3 \text{ feed tank conc. gm/l}} =$$

l/min of $Na_2CO_3$ needed

The above control equation requires the use of the aforementioned feed-back loop and the flow controller 25 and sampling line 22A in order to fine tune adjust the excess carbonate concentrations required to fully react all of the calcium ions in the brine to form calcium carbonate in the first reaction tank. This feed-back loop is required because there is not an excess carbonate concentration target term in the above noted control equation. The second control loop associated with this control equation uses on-line excess carbonate analysis of the brine from each of the carbonate reactors 12 and 14 as the process variable and uses the operating target as the set point.

However, where the control equation that incorporated an operating target into its calculations is used, the second control loop may be eliminated. The use of one feed-forward control loop was obtained by using the following control equation:

$$\frac{\frac{Ca^{++} gm/l}{48 \text{ gm/mole}}(106 \text{ gm/mole})(\text{brine flow l/min}) + \left(\begin{array}{c}\text{Excess} \\ CO_3 \text{ target} \\ gm/l\end{array}\right)\left(\begin{array}{c}\text{brine} \\ \text{flow} \\ l/min\end{array}\right)}{(Na_2CO_3 \text{ feed tank conc. gm/l})} =$$

l/min flow rate of $Na_2Co_3$ needed to react substantially all of the $Ca^{++}$ impurity in the brine.

The excess carbonate target employed was between about 0.5 to about 0.9 grams per liter, with a preferred concentration of about 0.6 grams per liter and an optimum of 0.8 grams per liter in a brine system that serviced a membrane chloralkali electrolytic cell.

Sampling locations within the brine system 10 were used to obtain the required carbonate and calcium ion concentrations. Calcium concentration was sampled through the sampling line illustrated as 19 in the FIG. Carbonate concentrations were taken in the second reaction tank 14 via the carbonate concentration reaction sampling line illustrated as 22A, in the settler 15 via the carbonate sampling line illustrated as 24, and the carbonate concentration in feed tank 16 via the sampling line 22A.

The sample that was fed out through sample line 24 was obtained from a point approximately one foot beneath the brine surface in the calcium carbonate settler 15. The brine sampled at this point contained about 1-10% solids which primarily consisted of large flocculant particles held in calcium carbonate and magnesium hydroxide. The concentration was determined through titration steps which will be explained in further detail hereafter.

The carbonate concentration sampling taken via sample line 22 from the second reaction tank is taken at a point about 2 feet beneath the brine surface in the second reaction tank 14. These samples typically contained about 1-10% solids that consisted primarily of calcium carbonate flocculant. Both samples taken from these two locations were siphoned through about 30 feet of ⅜" polytetrafluoroethylene tubing to a sampling panel located beneath the sample origin. These samples were automatically titrated with a microprocessor controlling an automatic titrator.

The automatic titrator can employ sampling valves (not shown) that are actuated open or close using air pressure provided by suitable air relays interconnected to the titrator through output modules. A suitable titrator is the Digichem 3000 made by Ionics, Inc. of Watertown Massachuessetts. This titrator is able to provide on-line analysis of sodium carbonate, caustic and calcium concentrations in brine in unit terms of grams per liter. This microprocessor based analyzer is a wet chemical analyzer that employs an Intel 8080A microprocessor chip to control all operations.

CALCIUM SAMPLING

The calcium concentration is sampled from the settler tank 11 via the brine outlet line 18A or the raw brine infeed line 18B when no settler tank 11 is used, and the calcium sampling line 19. Sampling is conducted by the use of a constant level overflow cup as a collection vessel so the brine sample enters the bottom of the cup and flows upwardly until it overflows into a drain line. The sample is taken from the overflow cup into the titrator through appropriate tubing by the displacement action of the sampling burret. To prevent the gradual build up of solids from occurring in the sampling cup, an automatic water flush is performed at the conclusion of each calcium titration.

The results of the calcium concentration are fed back to the microprocessor 29 for use in the control equation.

CARBONATE TITRATION

The carbonate titration is primarily performed at the locations 22A for the concentration of carbonate in the second reaction tank 14 and at carbonate sampling line 22B for the carbonate concentration in the soda ash or sodium carbonate feed tank. Titration can also be formed at settler sampling line 24 to determine the efficiency of the carbonate control system.

The titration procedure involves collecting approximately 13 milliliters from reaction sampling line 22A or about 1 milliliter from sampling line 22B into a spin cell cup that is titrated with about 0.1N hydrochloric acid at a fast rate until a pH of about 10.2 is reached. The titration rate is then slowed until a pH endpoint of about 9.5 is reached. Titration of the sample continues using 0.1N hydrochloric acid until the first strong inflection point below a pH of 5.5 is reached. The additional volume of titrant required to reach the inflection point is stored in memory, as is the volume of the titrant required to reach the 9.5 pH endpoint. The calculation of excess carbonate concentration in the Sample ($C_S$) is then obtained by multiplying the concentration of the titrant x the additional volume of titrant ($V_A$) required to reach the inflection point divided by the volume of the sample, ($V_S$) or $$C_S = \frac{C_t(V_A)}{V_S}.$$

This system of excess carbonate control is especially well adapted to brine systems employing sulfate control using a stream of calcium chloride addition which permits the sulfate to precipitate out as calcium sulfate. In brine systems where there is no sulfate control, however, the carbonate control system will work equally well.

In order to exemplify the results achieved, the following example is provided without any intent to limit the scope of the instant invention to the discussion therein.

EXAMPLE

A pilot brine system of the type illustrated in the FIG. was operated with a calcium chloride addition stream into a crystallizer and then into a settler tank to facilitate the removal of sulfate impurities from the brine by precipitation of calcium sulfate. The clear brine stream that was low in solids flowed from the settler to the sodium carbonate reaction tanks. Sodium carbonate was added to the brine in the reaction tanks to completely react the calcium into insoluble calcium carbonate. The three factors which determine the amount of sodium carbonate that should flow to complete the reaction were monitored as shown below in two hour intervals at the locations represented in the FIG. as sampling line 19, flow meter 13, and calcium carbonate settler sampling line 24.

TABLE I

| DAY | TIME | Ca++ Conc. #19 gpl | Brine Flow Rate #13 gpm | CO3Conc. #24 gpl |
|---|---|---|---|---|
| Day 1 | 800 | 1.93 | 13 | 1.06 |
| | 1000 | 1.93 | 14 | 1.85 |
| | 1200 | 1.9 | 14 | 1.72 |
| | 1400 | 1.95 | 14 | 1.85 |
| | 1600 | 2 | 14 | 1.19 |
| | 1800 | 2 | 14 | 1.2 |
| | 2000 | 1.9 | 13 | 1.3 |
| | 2200 | 1.9 | 13 | 1.2 |
| | 2400 | 1.95 | 13 | 1.1 |
| Day 2 | 200 | 1.95 | 13 | 0.7 |
| | 400 | 1.9 | 13 | 1.5 |
| | 600 | 1.9 | 14 | 2.3 |
| | 800 | 1.95 | 13 | 0.13 |
| | 1000 | 1.95 | 14 | 1.3 |
| | 1200 | 1.95 | 15 | 0.26 |
| | 1400 | 1.93 | 14 | 0.26 |
| | 1600 | 1.93 | 14 | 0.13 |
| | 1800 | 1.9 | 13 | 1.06 |
| | 2000 | 1.9 | 14 | 0.4 |
| | 2200 | 1.9 | 13 | 0.5 |
| | 2400 | 1.9 | 13 | 0.9 |
| Day 3 | 200 | 1.85 | 14 | 0.9 |
| | 400 | 1.9 | 13 | 0.9 |
| | 600 | 1.95 | 13 | 0.9 |
| | 800 | 1.98 | 13 | 0.8 |
| | 1000 | 2.1 | 15 | 1.1 |
| | 1200 | 2.1 | 15 | 1 |
| | 1400 | 1.89 | 13 | 0.9 |
| | 1600 | 1.82 | 14 | 0.9 |
| | 1800 | 1.79 | 15 | 0.86 |
| | 2000 | 1.85 | 13 | 0.78 |
| | 2200 | 1.93 | 15 | 1.325 |
| | 2400 | 1.9 | 15 | 1.19 |
| Day 4 | 200 | 1.9 | 15 | 0.92 |
| | 400 | 1.9 | 15 | 0.92 |
| | 600 | 1.9 | 13 | 0.9 |
| | 800 | 1.97 | 14 *AUTO ON* | 0.6 |
| | 1000 | 1.98 | 15 | 0.6 |
| | 1200 | 1.99 | 13 | 0.6 |
| | 1400 | 2.02 | 14 | 0.79 |
| | 1600 | 1.98 | 14 | 0.74 |
| | 1800 | 1.96 | 13 | 0.7 |
| | 2000 | 1.82 | 14 | 0.73 |
| | 2200 | 1.83 | 14 | 0.73 |
| | 2400 | 1.8 | 14 | 0.66 |
| Day 5 | 200 | 1.8 | 14 | 0.66 |
| | 400 | 1.82 | 13 | 0.75 |
| | 600 | 1.83 | 15 | 0.73 |
| | 800 | 1.86 | 13 | 0.66 |
| | 1000 | 1.87 | 15 | 0.74 |
| | 1200 | 1.88 | 12 | 0.74 |
| | 1400 | 1.86 | 13 | 0.76 |
| | 1600 | 1.86 | 15 | 0.79 |
| | 1800 | 1.82 | 13 | 0.76 |
| | 2000 | 1.8 | 14 | 0.8 |
| | 2200 | 1.8 | 15 | 0.8 |
| | 2400 | 1.75 | 14 | 0.7 |

TABLE I-continued

| DAY | TIME | Ca++ Conc. #19 gpl | Brine Flow Rate #13 gpm | CO3Conc. #24 gpl |
|---|---|---|---|---|
| Day 6 | 200 | 1.75 | 13 | 0.7 |
|  | 400 | 1.75 | 16 | 0.6 |

The Auto On entry in the Table indicates when the automatic process control was initiated to monitor the concentrations and to obtain via the previously described feed forward control loop and equation, the uniform control of sodium carbonate flow to substantially react all of the carbonate. The carbonate concentration subsequent to this time in the settler sampling line shows a marked decrease and smaller variations than previously recorded.

While the preferred process in which the principles of the present invention have been incorporated is shown and described above, it is to be understood that the invention is not to be limited to the particular details thus presented but, in fact, widely different means and steps may be employed in the practice of the broader aspect of this invention. For example, it is to be noted that the carbonate control system is equally applicable to chlor-alkali or sodium chlorate electrolytic cell systems. These cell systems could equally well employ membranes, diaphragms or flowing mercury cathodes. The scope of the appended claims is intended to encompass all obvious changes in the details, materials and arrangement of process steps that will occur to one of ordinary skill in the art upon a reading of this disclosure.

Having thus described the invention, what is claimed is:

1. A process to automatically control concentration of excess carbonate by addition of sodium carbonate from a sodium carbonate feed tank to an electrolytic cell brine system, the system employing at least one carbonate reactor, comprising the steps of:
   (a) measuring flow rate of brine through the at least one carbonate reactor;
   (b) measuring calcium concentration in brine flowing to the at least one carbonate reactor;
   (c) measuring the sodium carbonate concentration in the sodium carbonate feed tank;
   (d) adjusting sodium carbonate flow rate necessary to remove substantially all calcium impurities from the system as calcium carbonate; and
   (e) automatically adjusting sodium carbonate flow rate to the at least one carbonate reactor to equal the quantity of sodium carbonate necessary to remove substantially all of the calcium impurities from the system and achieve a desired concentration of excess carbonate by repeatedly comparing the results of steps (c) and (d) above.

2. The process according to claim 1 wherein the calculating of the quantity of sodium carbonate necessary to remove substantially all of the calcium impurities from the system is done from the equation:

$$\text{Desired Flow Rate} = \frac{\frac{Ca^{++} \text{ gm/l}}{40 \text{ gm/mole}} (106 \text{ gm/mole})(\text{brine flow rate l/min}) + \left(\begin{array}{c}\text{Excess} \\ CO_3 \text{ target} \\ \text{gm/l}\end{array}\right)\left(\begin{array}{c}\text{Brine} \\ \text{Flow} \\ \text{l/min}\end{array}\right)}{(Na_2CO_3 \text{ concentration in feed tank gm/l})}$$

3. The process according to claim 2 wherein the measuring of the calcium concentration in the brine flowing to the at least one carbonate reactor is done by titration.

4. The process according to claim 3 wherein the measuring of the concentration of sodium carbonate in the sodium carbonate feed tank is done by titration.

5. The process according to claim 4 wherein the measuring flow rate of brine through the at least one carbonate reactor is measured by a flow meter.

6. The process according to claim 2 wherein the calcium carbonate is removed from the brine system by precipitating out as flocculant.

* * * * *